Patented Apr. 1, 1924.

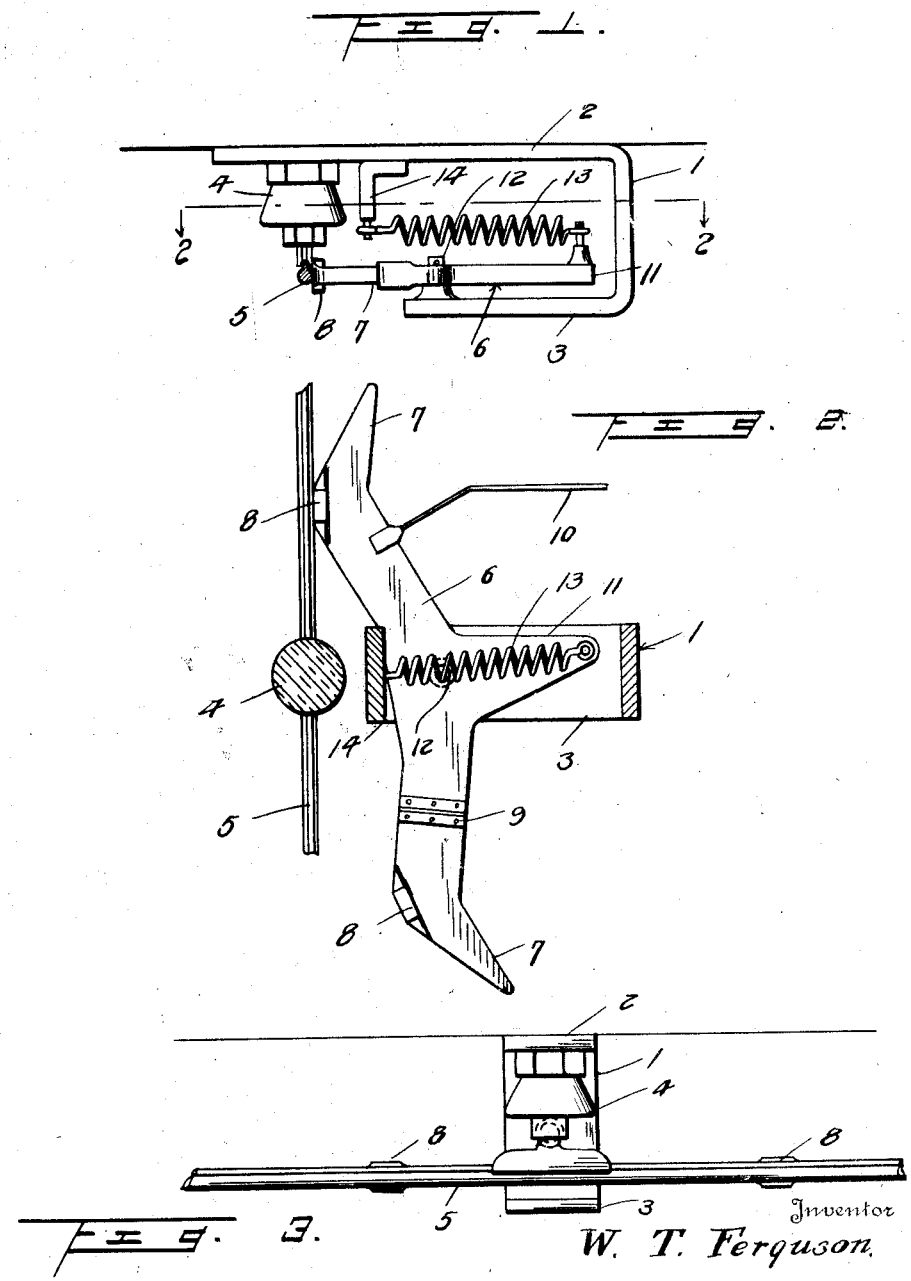

1,488,485

UNITED STATES PATENT OFFICE.

WILLIAM T. FERGUSON, OF BECKLEY, WEST VIRGINIA.

CIRCUIT CLOSER FOR ELECTRIC-LIGHT SIGNALS.

Application filed June 17, 1922. Serial No. 569,002.

*To all whom it may concern:*

Be it known that I, WILLIAM T. FERGUSON, a citizen of the United States, residing at Beckley, in the county of Raleigh and State of West Virginia, have invented certain new and useful Improvements in Circuit Closers for Electric-Light Signals; and I do hereby declare the following to be a full, clear, and exact description of the invention, such as will enable others skilled in the art to which it appertains to make and use the same.

The invention relates more particularly to mine signals and chiefly to the circuit closer which is adapted to be automatically operated by the trolly arm of a mine car.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a front view of a signal circuit closing means embodying the invention, Figure 2 is a horizontal section on the line 2—2 of Figure 1, and Figure 3 is a side elevation.

Corresponding and like parts are referred to in the following description and designated in the several views of the drawings by like reference characters.

A bracket 1 comprising an upper member 2 and a lower member 3 is adapted to be secured to the roof of a mine drift or passage, preferably by means of an insulator 4 to which a trolly wire 5 is attached. The members 2 and 3 are spaced apart and the member 2 is of greater length than the member 3 so as to receive the fastening means 4. A circuit closing member 6 is pivoted intermediate its ends to the member 3 of the bracket 1 and its opposite ends are of similar or like formation each having a flared terminal 7 and a widened or expanded contact portion 8 at the inner end or base of the flared part 7. The widened or expanded contact portions 8 are adapted to engage the trolly wire 5. The flared portions 7 insure passage of the trolly arm (not shown) between the trolly wire 5 and the end of the member 6 so as to move the latter in a positive manner. The portions of the circuit closing member 6 upon opposite sides of the contact parts 8 are similarly inclined in opposite directions to insure movement of the member 6 by the trolly arm of the car when traveling in either direction. An end portion of the circuit closing member 6 is insulated by means of a joint 9 so that when the insulated end is in contact with the trolly wire 5, the signal circuit is broken. A wire 10 connects to the live end of the circuit closing member so that when such end is in contact with the trolly wire 5, current is derived from said trolly wire to operate the signal which in the present instance is a light. An arm 11 projects outwardly from the circuit closing member 6 in line with the pivot 12 thereof. A contractile helical spring 13 connects the outer end of the arm 11 with a projection 14 depending from the member 2 of the bracket. The parts are so disposed that when the circuit closing member 6 is parallel with the trolly wire 5, the spring 13 is at right angles to said trolly wire and a straight line passing through the pivot 12 will intersect the contact of the spring 13 with the parts 11 and 14. When the circuit closing member 6 is moved to bring either of its ends into contact with the trolly wire, the spring 13 operates to maintain said contact. Lateral movement of the end of the member 6 to carry the same away from the trolly wire 5 shifts the position of the spring 13 so as to carry its outer end past a perpendicular line passing through the pivot 12 whereby the opposite end of the member 6 is moved inwardly and held in contact with the trolly wire 5 as will be readily appreciated.

What is claimed is:—

1. A circuit closer for a signal circuit, the same comprising a pivoted member having a contact portion and having parts upon opposite sides of said contact portion reversely inclined, and a spring in cooperative relation with the pivoted member to hold the same in either of its extreme movements and to urge the same in its final movement after being initially moved from either position.

2. A circuit closer comprising a supporting member, a member pivoted intermediate its ends to the supporting member, said member having contact portions widened or laterally expanded, one of said contact portions being electrically insulated, said member having parts upon opposite sides of the contact portions reversely inclined, an arm secured to said member and arranged perpendicular thereto and in the plane of movement thereof, and a lead wire connected to the non-insulated portion of said member.

3. A circuit closer comprising a supporting member, a member pivoted intermediate its ends to the supporting member, said member having end contact portions widened or laterally expanded, one of said contact portions being electrically insulated, said member having parts upon opposite sides of the contact portions reversely inclined, an arm secured to said member and arranged perpendicular thereto and in the plane of movement thereof, and a contractile helical spring connecting the outer end of the arm with the support and normally tending to hold the pivoted member in either extreme positions and to complete the movement thereof after being initially operated from either extreme positions.

4. An electric circuit closer comprising a supporting member, a member pivoted intermediate its ends to the supporting member, said member having end contact portions, one of said contact portions being electrically insulated, a lead wire connected to the non-insulated portion of said member, and a contractile helical spring connecting the outer end of the arm with the support and normally tending to hold the pivoted member in either extreme positions and to complete the movement thereof after being initially operated from either extreme positions.

5. A circuit closer comprising a supporting member, a member pivoted intermediate its ends to the supporting member, said pivoted member having end contact portions, one of said contact portions being electrically insulated, said member having parts upon opposite sides of the contact portions reversedly inclined.

In testimony whereof I affix my signature in presence of two witnesses.

WILLIAM T. FERGUSON.

Witnesses:
 E. B. DODSON,
 J. O. HARVEY.